United States Patent [19]

Smith et al.

[11] Patent Number: 4,726,571
[45] Date of Patent: Feb. 23, 1988

[54] HEIGHT CONTROL VALVE WITH SPRING RETURN ACTUATOR

[75] Inventors: John P. Smith, Grand Rapids; Lyle M. Hagan, Muskegon, both of Mich.

[73] Assignee: Lear Siegler, Inc., Santa Monica, Calif.

[21] Appl. No.: 840,902

[22] Filed: Mar. 17, 1986

[51] Int. Cl.[4] .................. B60G 17/00; B60G 11/26; F16F 9/18; F16J 1/00
[52] U.S. Cl. ................................ 267/64.16; 92/169; 92/172; 267/124; 280/714; 384/626
[58] Field of Search ............. 267/64.16, 124, DIG. 1; 188/317, 322.22, 322.19; 280/711, 714; 92/169, 172, 169, 170, 172, 209, 248; 74/99 A; 137/625.21; 264/334; 384/626, 908

[56] References Cited

U.S. PATENT DOCUMENTS

| | | | |
|---|---|---|---|
| 1,379,041 | 5/1921 | Pulliam | 92/209 |
| 1,537,525 | 5/1925 | Chilton et al. | 92/172 |
| 2,976,053 | 3/1961 | Pribonic et al. | 280/714 |
| 3,132,569 | 5/1964 | Shepherd | 92/172 X |
| 3,147,668 | 9/1964 | Falconer | 92/162 X |
| 3,232,186 | 2/1966 | Garrett et al. | 92/172 |
| 3,292,501 | 12/1966 | Verbeek | 92/169 |
| 3,522,760 | 8/1970 | Putman | 92/172 X |
| 3,526,168 | 9/1970 | Brown | 92/172 X |
| 3,530,772 | 9/1970 | Mori | 92/170 X |
| 3,563,270 | 2/1971 | Denny | 137/625.21 |
| 3,769,880 | 11/1973 | Marjanic | 92/169 |
| 3,815,481 | 6/1974 | Pauliukonis | 92/170 X |
| 3,858,903 | 1/1975 | Henry et al. | 137/625.21 X |
| 3,884,454 | 5/1975 | Passmore | 267/64.16 |
| 3,892,166 | 7/1975 | Johansson | 92/169 |
| 4,585,099 | 4/1986 | Taylor | 188/322.19 |

Primary Examiner—Andres Kashnikow
Assistant Examiner—Robert J. Oberleitner
Attorney, Agent, or Firm—Varnum, Riddering, Schmidt & Howlett

[57] ABSTRACT

A height control valve with a spring return actuator for use in an air spring suspension has a damping chamber, an air control chamber and an actuator controlled spring return housing with mutually perpendicular lateral and axial bores. An actuator shaft extends into the damping chamber, the air control chamber and the lateral bore of the spring return housing. The spring return housing is rotatably mounted to the actuator shaft. A spring cup is reciprocably guided in the axial bore and is biased in contact with a flattened portion of the actuator shaft. The spring cup has two axially spaced cylindrical exterior surfaces of essentially zero draft angle and of slightly different diameter. The axial bore cylindrical surfaces are in registry with the spring cup cylindrical surface. The registering cylindrical surfaces of the spring cup and axial bore have dimensions of close correspondence to ensure a snug fit of the spring cup within the axial bore. A thin lubricating shim is provided between an actuator shaft and the interior walls of the air control chamber.

22 Claims, 6 Drawing Figures

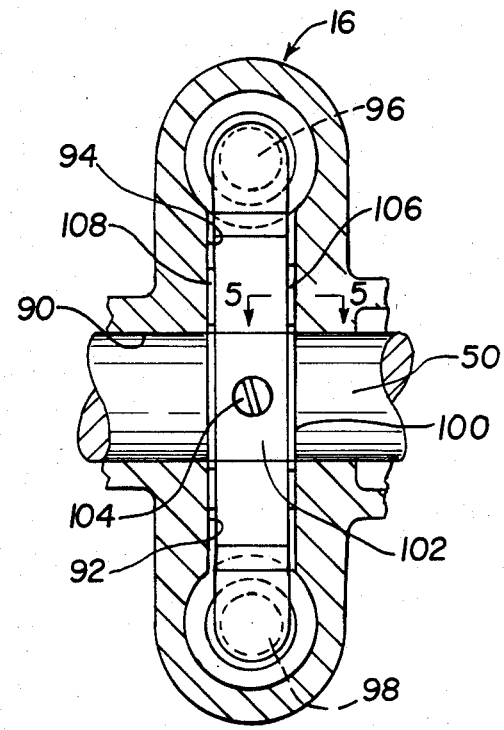
FIG. 4
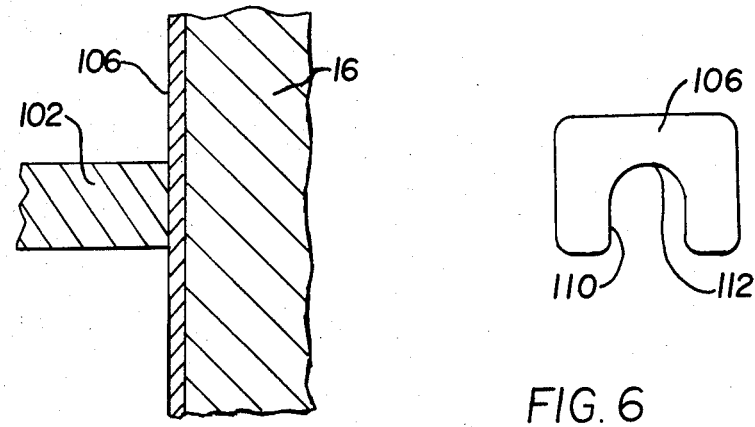
FIG. 5
FIG. 6

HEIGHT CONTROL VALVE WITH SPRING RETURN ACTUATOR

TECHNICAL FIELD

This invention relates to height control valve structures with spring return actuators. In one of its aspects, the invention relates to a leveling valve having an improved spring return structure to operate an actuator shaft.

BACKGROUND ART

In U.S. Pat. No. 3,858,903 (issued Jan. 7, 1975), there is disclosed and claimed a leveling valve for an air spring suspension system comprising a damping chamber, an air control chamber and an actuator controlled spring return housing. A rotatable actuator shaft extends into the damping chamber, the air control chamber and a lateral bore in the spring return housing. The spring return housing is rotatably mounted on the actuator shaft and has an axial bore perpendicular to the lateral bore. A spring cup is reciprocably guided in the axial bore and is biased in contact with the actuator shaft. A flat surface is ground onto the actuator shaft in registry with the axial bore. The bottom of the spring cup seats on the flat surface of the actuator shaft so that rotation of the spring return housing with respect to the actuator shaft results in resilient movement of the spring cup within the axial bore of the spring return housing. Thus, on rotational movement of the spring return housing, a torque is applied to the actuator shaft tending to rotate the actuator shaft about its axis and thereby operate air valves to permit air to flow into or out of an air spring. The force of the edge of the actuator flat surface against the bottom of the spring cup tends to produce lateral as well as axial forces on the spring cup. If the tolerances between the axial bore and the spring cup are not extremely close, the spring cup will tend to move laterally and thereby forfeit a portion of what otherwise would be axial movement of the spring cup. This condition results in less or no torque on the actuator shaft. In order to provide for close tolerances between the axial bore and the spring cup, a machining operation is necessary on one or both of the axial bore or the outer surface of the spring cup. This machining operation is expensive and adds considerable labor cost to this part.

It is desirable to mold the spring return housing out of a plastic or to cast it from metal. In order to form the axial bore, a pin must be used in the mold. A draft angle must be provided along the length of the axial bore in order to remove the pin from the bore. The draft angle will necessarily result in more than desirable tolerance between the spring cup and the axial bore. Thus, a machining operation would be necessary in order to provide a perfectly cylindrical axial bore.

SUMMARY OF THE INVENTION

According to the invention, desirable tolerances between a spring cup and an axial bore in a valve structure are maintained by providing axially spaced cylindrical surfaces of slightly different diameter in the axial bore and on the spring cup. Further, the wall thickness of the spring return housing along the axial bore is maintained substantially constant. With this structure, the spring return housing can be molded out of plastic or cast from a metal while maintaining the necessary close tolerances and without an expensive machining operation.

More particularly, the invention relates to a valve shaft actuator, preferably for a leveling valve used in an air spring suspension system, where a spring return housing is rotatably mounted to an actuator shaft through a lateral bore in the housing, the housing having an axial bore perpendicular to the lateral bore and a spring cup reciprocably guided in the axial bore and biased in contact with an actuator shaft. Means on the actuator shaft in registry with the axial bore of the spring retainer housing and torque on the actuator shaft and on the bottom of the spring cup provide resilient movement of the spring cup within the axial bore of the spring retainer housing and torque on the actuator shaft upon rotation of the spring return housing with respect to the actuator shaft. According to the invention, the spring cup has two axially spaced cylindrical exterior surfaces of essentially zero draft angle and of slightly different diameter. The axial bore also has two axially spaced cylindrical surfaces of essentially zero draft angle and of slightly different diameter. The axial bore cylindrical surfaces are in registry with the spring cup cylindrical surfaces and the registering cylindrical surfaces of the spring cup and the axial bore have dimensions of close correspondence to ensure a snug fit of the spring cup within the axial bore.

In a preferred embodiment of the invention, the leveling valve further has a damping chamber, an air control chamber and an actuator controlled spring return housing of the nature disclosed in the Henry et al U.S. Pat. No. 3,858,903. The actuator shaft extends into the damping chamber and the air control chamber as well as into the lateral bore of the spring return housing.

In a preferred form of the invention, there is a draft angle provided by a cylindrical area of slightly tapering diameter between the axial bore spaced cylindrical surfaces. Further, the small-diameter cylindrical surface of the axial bore is positioned closest to the lateral bore. A draft angle is provided between the axially spaced cylindrical surfaces of the spring cup also. Alternatively, a step can be provided between the axially spaced cylindrical surfaces on the spring cup. The wall thickness of the spring return housing along the length of the axial bore is substantially constant for uniform cooling of the axial bore to maximize dimensional stability of the axial bore.

The air control chamber has an internal cavity defined by cavity walls. An actuator is mounted to the shaft and extends into the cavity in close proximity to the cavity walls. At least one thin lubricating shim is provided between the actuator and the cavity walls. Preferably, the lubricating shim is made from TEFLON coated fiberglass cloth.

BRIEF DESCRIPTION OF THE DRAWINGS

The invention will now be described with reference to the accompanying drawings in which:

FIG. 4 is a partial sectional view taken along lines 4—4 of FIG. 1;

FIG. 5 is a partial sectional view taken along lines 5—5 of FIG. 4; and

FIG. 6 is a plan view of a shim used according to the invention.

BEST MODE FOR CARRYING OUT THE INVENTION

Figure 1:
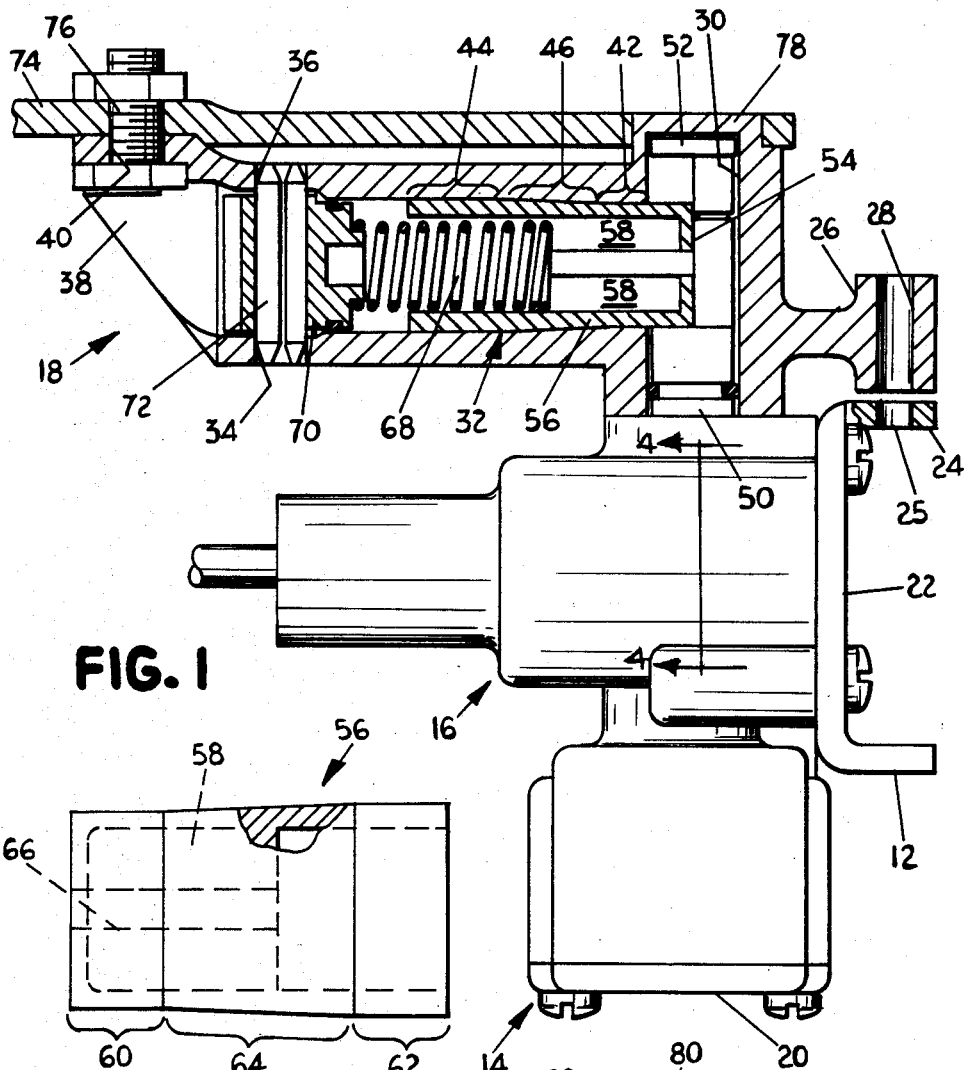
FIG. 1 is a side elevational view, partly in section, showing a leveling valve according to the invention.

Referring now to the drawings, and to FIG. 1 in particular, there is shown a leveling valve of the type which is described and claimed in U.S. Pat. Nos. 3,858,903 and 3,884,454, both of which are incorporated herein by reference. The leveling valve disclosed and claimed in this application is similar in all respects to the leveling valve disclosed and claimed in these two patents except for the spring-housing return chamber and the air control chamber, both of which are described in detail. Generally, the leveling valve has a valve housing comprising a damping-chamber housing 14 and an air control housing 16. A rotatable spring return housing 18 is pivotably mounted to the air control housing 16. End plate 20 is provided on the end of the damper-chamber housing 14 and an end plate 22 is provided on the air control housing 16. The end plate 22 has integrally formed therewith in a mounting bracket 12 and an alignment bracket 24 with a lateral alignment opening 25 therethrough.

The rotatable spring return housing 18 has a mounting flange 26 having a hole 28 extending therethrough. The mounting flange is used to align the spring return housing 18 with the air control housing 16. To this end, a pin (not shown) is temporarily positioned through the opening 25 and the hole 28 to correctly position the spring return housing with respect to the air control housing 16. Thereafter, the pin is removed from both the opening 25 and the hole 28. A lateral bore 30 and an axial bore 32 provide a relatively hollow spring return housing with relatively uniform thickness walls. Holes 34 and 36 are provided in one end of the return housing 18 and a hole 40 is provided in a projecting flange 38 at an axial end of the return housing 18.

The interior diameter of the axial bore 32 is very important and has zero-draft cylindrical areas 42 and 44 separated by a slight cylindrical draft area 46 of slightly tapering diameter. The cylindrical area 42 has a slightly less diameter than the cylindrical area 44 so that the draft area 46 expands slightly between the cylindrical area 42 and the cylindrical area 44.

A shaft 50 extends into the lateral bore 30 and through the air control housing 16 into the damping-chamber housing 14 in the manner disclosed and claimed in the U.S. Pat. Nos. 3,884,454 and 3,858,903. The shaft 50 has a flat section 54 in registry with the axial bore 32 and a bearing end 52 which is securely seated in the inner end of the lateral bore 30. The shaft 50 is typically made out of machined steel and can have at least the flat section 54 polished and plated.

Figure 2:
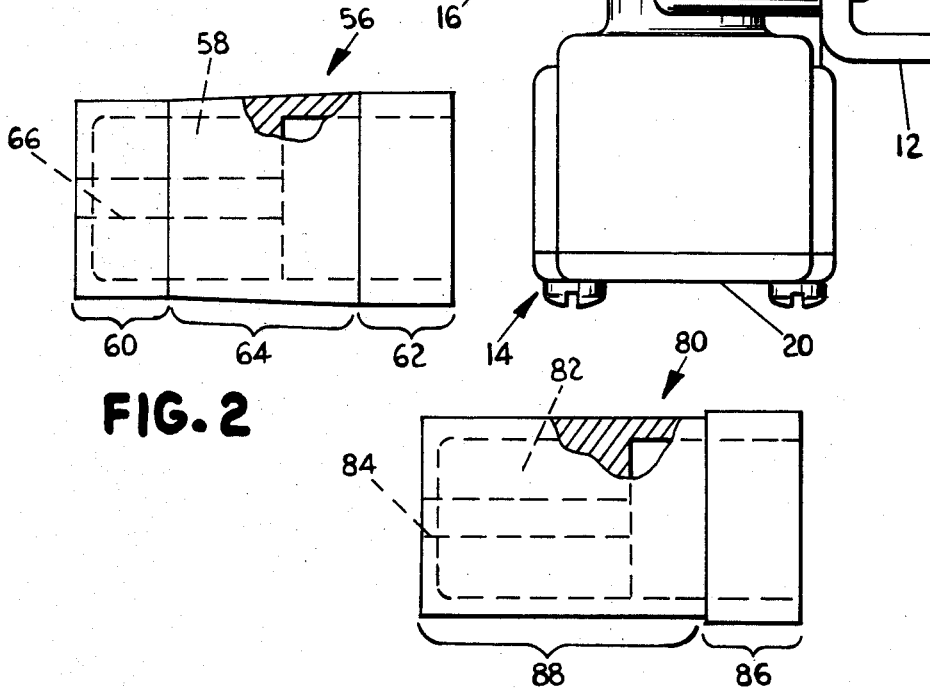
FIG. 2 is an enlarged view, partially in section, of a spring cup used in the leveling valve shown in FIG. 1.

A spring cup 56 has a plurality of interior partitions 58 and a hole 66 in a flat, closed end thereof. As illustrated in FIG. 2, the spring cup has cylindrical areas 60 and 62 separated by a slight draft area 64. Thus, the diameter of the cylindrical area 60 is less than the diameter of the cylindrical area 62 and draft area 64 expands slightly between the cylindrical areas 60 and 62.

As seen in FIG. 1, the closed end of the spring cup 56 seats against the flat section 54 of the shaft 50 and, in such condition, the cylindrical area 60 of the spring cup 56 is in registry with the cylindrical area 42 of the spring return housing 18. Further, the cylindrical area 62 of the spring cup 56 is in registry with the cylindrical area 44 of the spring return housing 18. The diameters of the cylindrical areas 42, 44, 60 and 62 are maintained within close tolerances so that the cylindrical area 60 fits snugly within the cylindrical area 42 and so that the cylindrical area 62 fits snugly within the cylindrical area 44. Thus, the spring cup 56 is axially slidable within the axial bore 32 but little, if any, lateral movement is permitted between the spring cup 56 and the axial bore 32.

A coiled compression spring 68 is mounted within the spring cup 56 and bears against the interior partitions 58 thereof. A retainer block 70 is mounted in the outer end of the axial bore 32 and is retained in position by a pin 72 which extends through the holes 34 and 36. The pin 72 can be an expanding pin which is press-fit within the holes 34 and 36. The spring 68 bears against the retainer block 70 and is thereby retained in compression against the interior of the spring cup 56. Lubrication is preferably provided within the axial bore 32.

An actuating lever 74 is mounted to the outside of the spring return housing 18 through a bolt 76 and through a rounded boss 78 on the spring return housing 18. The actuating lever 74 is typically connected to the suspension system so that it moves vertically with the suspension.

As seen in FIG. 4, the air control housing 16 has an axial bore 90 through which the shaft 50 extends. Housing 16 further has a lower hollow chamber 92 and an upper hollow chamber 94 in which are positioned respectively the air valves 96 and 98. The shaft 50 has a vertical recess 100 in which is mounted an actuator 102 through screw 104. The actuator 102 has upper and lower portions which are adapted to engage the air valves 96 and 98 when the shaft is rotated with respect to the housing 16. Further, according to the invention, shims 106 and 108 are provided between the walls of the hollow chambers 92 and 94 and the actuator 102. As seen in FIG. 5, the shim 106 provides a close tolerance between the actuator 102 and the walls of the hollow chambers.

As seen in the FIG. 6, the shim 106 is rectangular in configuration but has a slot 110 terminating in an internal radius 112 at one side thereof. The radius 112 is slightly larger than the diameter of the shaft 50 so that it fits around the shaft and does not interfere with the rotation of the shaft.

The shims 106 and 108 are identical and each are made out of a very thin low friction material such as TEFLON coated fiberglass cloth. Typically, the shims will be about 0.005 inches (0.127 mm) thick. The shims function to provide close tolerances between the actuator and the walls of the hollow chambers 92 and 94 and further provide a lubricated surface adjacent which the actuator moves. Thus, the shims also provide a lubrication function for the actuators and reduce the friction between the actuators and the walls of the air control housing 16. One or more shims 106 or 108 can be used to adjust the proper tolerances between the walls of the hollow chambers and the actuator 102.

In operation, as the vehicle changes height, the lever 74 will rotate the spring return housing 18 about the shaft 50. Although the shaft 50 is rotatable within the air control housing 16 and the damping chamber housing 14, the effect of the damping chamber 14 tends to maintain the shaft 50 in an equilibrium position as illustrated in FIG. 1. However, in the event that a torque is continuously applied to the housing 18, the shaft 50 will slowly rotate within the air control housing 16 and within the damping-chamber housing 14 to adjust the flow of air to or from an air spring to thereby control the vehicle height. The purpose of damping the rotation of shaft 50 is to avoid responding to bumps in the road or temporary aberrations in the suspension height with respect to the vehicle frame.

As the spring return housing 18 is rotated about the shaft 50, it produces a torque on shaft 50 about the center line thereof. This torque is produced by the pressure of spring cup 56 against one edge of the flat section 54 of the shaft 50. The flat bottom of the spring cup 56 and the flat section function as a means to resiliently move the spring cup 56 within the axial bore 32 and for applying torque to the shaft 50 upon relative rotation of the spring return housing 18 with respect to the actuator shaft 50. Other means to accomplish this function are within the skill of the art. Thus, as the spring return housing 18 rotates on the shaft 50, the spring cup is forced to the left as illustrated in FIG. 1 against the tension in the compression spring 68 by the edges of the flat section 54. This movement tends to produce a lateral as well as an axial force on the spring cup 56. If there is any play or tolerance between the spring cup 56 and the axial bore 32, the spring cup 56 will tend to move laterally and thereby forfeit a portion of its axial movement. The lateral movement results in less or no torque on the shaft 50. The invention, however, provides for very tight tolerances between the spring return housing 18 and the axial bore 32. Thus, substantially all of the rotational movement of the spring return housing 18 is translated into axial movement of the spring cup 56 and a proportional torque on the shaft 50. Thus, the invention makes a much more accurate and more responsive height control valve in that rotational movement of the lever arm 74 is transferred in direct proportion to a torque on the shaft 50.

Figure 3:
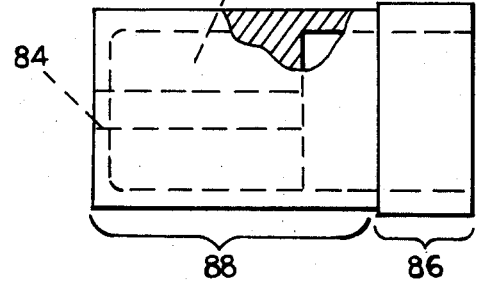
FIG. 3 is an enlarged view, partially in section, of an alternate spring cup which can be used in the leveling valve shown in FIG. 1.

FIG. 3 illustrates a second embodiment of a spring cup which could be used according to the invention. In FIG. 3, the spring cup 80 has interior partitions 82 and an opening 84 at the bottom thereof in similar fashion to the spring cup 56. A cylindrical portion 86 is provided near the open end of the spring cup 80 and the remainder of the outer surface of the spring cup has a uniform cylindrical area 88. Thus, there are two cylindrical areas in the spring cup 80 with the cylindrical area 88 being of less diameter than the cylindrical portion 86.

The spring cup 80 would function in the spring return housing 18 in the same fashion as the spring cup 56.

The invention provides a means by which both the rotatable spring return housing 18 and the spring cup 56 (or 80) can be manufactured to close tolerances by injection molding techniques of plastics or through die-casting of metals. Typically, such operations require a pin, for example, to form the axial bore 32. In order to remove the pin from the bore 32, it must have a taper or draft angle. This taper or draft angle typically results in loose tolerances between the spring cup and the bore. Otherwise, machining is required to bring the tolerances into close proximity. With the invention, expensive machining operations can be avoided, and yet close tolerances are provided between the bore 32 and the spring cup 56 or spring cup 80.

Reasonable variation and modification are possible within the scope of the foregoing disclosure and drawings without departing from the spirit of the invention.

The embodiments of the invention in which an exclusive property or privilege is claimed are defined as follows:

1. In a leveling valve for an air spring suspension comprising a damping chamber; an air control chamber; an actuator controlled spring return housing having mutually perpendicular lateral and axial bores; an actuator shaft extending into the damping chamber, the air control chamber and the lateral bore in the spring return housing; said spring return housing being rotatably mounted to said actuator shaft; a spring cup reciprocably guided in the axial bore and biased in contact with the actuator shaft; means on said actuator shaft in registry with the axial bore of the spring return housing and on the bottom of the spring cup to provide resilient movement of the spring cup within the axial bore of the spring return housing and torque to the actuator shaft about the axis thereof upon rotation of the return housing with respect to the actuator shaft; the improvement which comprises:
   said spring cup having two axially spaced cylindrical exterior surfaces of essentially zero draft angle and of slightly different diameter;
   the axial bore also having two axially spaced cylindrical surfaces of essentially zero draft angle and of slightly different diameter separated by a cylindrical area of slightly tapering diameter, the axial-bore cylindrical surfaces being in registry with the spring-cup cylindrical surfaces, and the registering cylindrical surfaces of the spring cup and axial bore having dimensions of close correspondence to ensure a snug fit of the spring cup within the axial bore.

2. A leveling valve according to claim 1 wherein the axial bore cylindrical surface having a smaller diameter is closest to the lateral bore.

3. A leveling valve according to claim 2 wherein the wall thickness of the spring return housing along the length of the axial bore is substantially constant.

4. A leveling valve according to claim 3 and further comprising a draft angle between axially spaced 5. A leveling valve according to claim 3 and further comprising a step between the axially spaced cylindrical surfaces on the spring cup.

6. A leveling valve according to claim 1 wherein the wall thickness of the spring return housing along the length of the axial bore is substantially constant.

7. A leveling valve according to claim 6 and further comprising a draft angle between the axially spaced cylindrical surfaces on the spring cup.

8. A leveling valve according to claim 6 and further comprising a step between the axially spaced cylindrical surfaces on the spring cup.

9. A leveling valve according to claim 1 and further comprising a draft angle between the axially spaced cylindrical surfaces on the spring cup.

10. A leveling valve according to claim 1 and further comprising a step between the axially spaced cylindrical surfaces on the spring cup.

11. A leveling valve according to claim 1 wherein the air control chamber has an internal cavity defined by cavity walls; and further comprising an actuator mounted to the shaft and extending into the cavity in close proximity to the cavity walls; and a thin lubricating shim positioned between the actuator and the cavity walls.

12. A leveling valve according to claim 11 wherein said shim is formed from a TEFLON-coated fiberglass cloth.

13. In a valve-shaft actuator wherein a spring return housing is rotatably mounted to an actuator shaft through a lateral bore, the housing having an axial bore perpendicular to the lateral bore; a spring cup reciprocably guided in the axial bore and biased in contact with the actuator shaft; means on the actuator shaft in registry with the axial bore of the spring retainer housing and on the bottom of the spring cup to provide resilient movement of the spring cup within the axial bore of the spring return housing and torque to the actuator shaft about the axis thereof upon rotation of the spring return housing with respect to the actuator shaft, the improvement which comprises:

said spring cup having two axially spaced cylindrical exterior surfaces of essentially zero draft angle and of slightly different diameter;

an axial bore also having two axially spaced cylindrical surfaces of essentially zero draft angle and of slightly different diameter separated by a cylindrical area of slightly tapering diameter, said axial-bore cylindrical surfaces being in registry with the spring cup cylindrical surfaces and the registering cylindrical surfaces of the spring cup and axial bore having dimensions of close correspondence to ensure a snug fit of the spring cup within the axial bore.

14. A leveling valve according to claim 13 wherein the axial bore cylindrical surface having a smaller diameter is closest to the lateral bore.

15. A leveling valve according to claim 14 wherein the wall thickness of the spring return housing along the length of the axial bore is substantially constant.

16. A leveling valve according to claim 14 and further comprising a draft angle between axially spaced cylindrical surfaces on the spring cup.

17. A leveling valve according to claim 14 and further comprising a step between the axially spaced cylindrical surfaces on the spring cup.

18. A leveling valve according to claim 13 wherein the wall thickness of the spring return housing along the length of the axial bore is substantially constant.

19. A leveling valve according to claim 18 and further comprising a draft angle between axially spaced cylindrical surfaces of the spring cup.

20. A leveling valve according to claim 18 and further comprising a step between the axially spaced cylindrical surfaces of the spring cup.

21. A leveling valve according to claim 13 wherein the means on the actuator shaft in registry with the axial bore comprises a flattened surface and the means on the bottom of the spring cup comprises a flattened surface.

22. A leveling valve for an air spring suspension comprising a damping-chamber; an air control chamber having an internal cavity defined by cavity walls; an actuator controlled spring return housing having mutually perpendicular lateral and axial bores; and actuator shaft extending into the damping-chamber, the air control chamber and the lateral bore in the spring return housing; said spring return housing being rotatably mounted to the actuator shaft; a spring cup reciprocably guided in the axial bore and biased in contact with the actuator shaft; means on the actuator shaft in registry with the axial bore of the spring return housing and on the bottom of the spring cup to provide resilient movement of the spring cup within the axial bore of the spring return housing and to torque to the actuator shaft about the axis thereof upon rotation of the spring return housing with respect to the actuator shaft; an actuator mounted on the actuator shaft and extending into the internal cavity of the air control chamber in close proximity to the cavity walls; the improvement which comprises;

a thin lubricating shim made of a single sheet of TEFLON-coated fiberglass cloth positioned between the said actuator and the cavity walls of the air control chamber to provide close tolerances between the actuator and the cavity walls and to further provide for lubrication between the actuator and the cavity walls.

* * * * *

UNITED STATES PATENT AND TRADEMARK OFFICE
CERTIFICATE OF CORRECTION

PATENT NO. : 4,726,571
DATED : February 23, 1988
INVENTOR(S) : SMITH ET AL.

It is certified that error appears in the above-identified patent and that said Letters Patent are hereby corrected as shown below:

```
Column 6, line 38, after "spaced" insert
--cylindrical surfaces of the spring cup--.
```

Signed and Sealed this

Tenth Day of January, 1989

*Attest:*

DONALD J. QUIGG

*Attesting Officer*  *Commissioner of Patents and Trademarks*